UNITED STATES PATENT OFFICE.

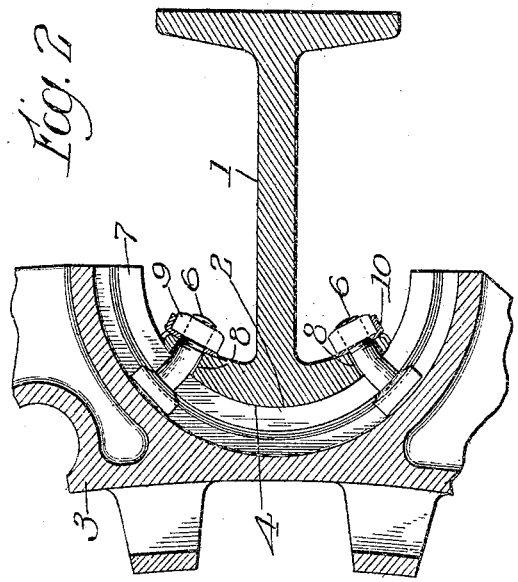
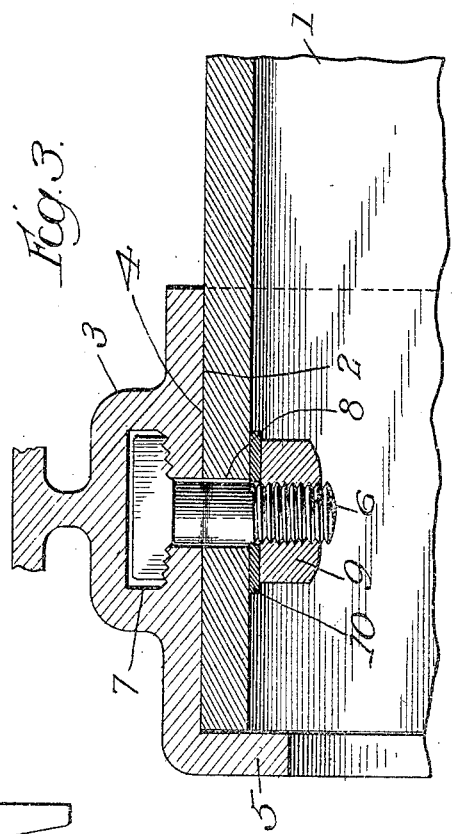
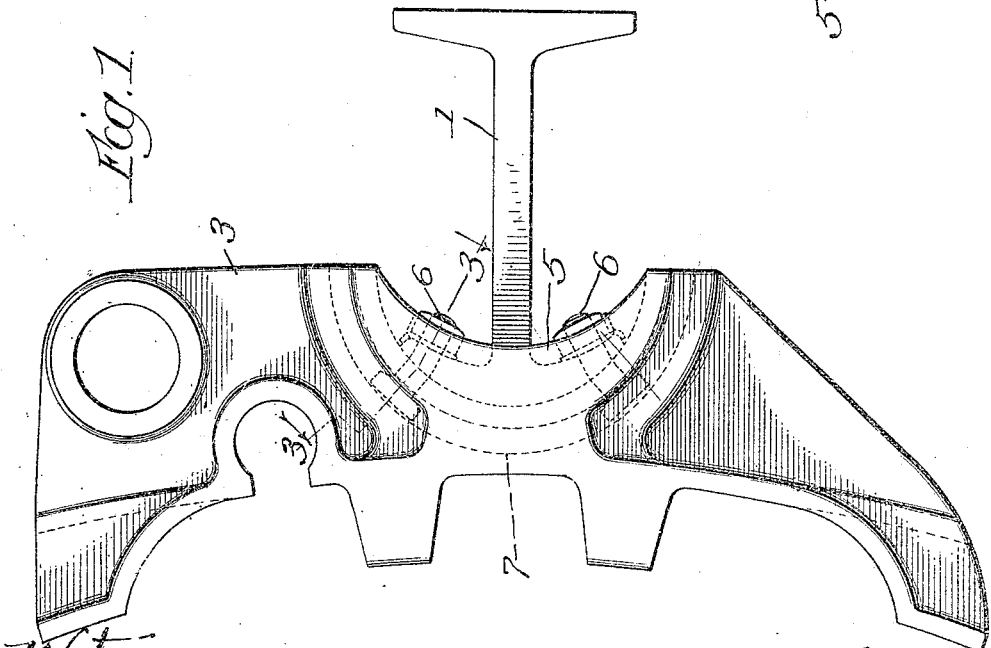

HENRY ZIEMSS, JR., OF CHICAGO, ILLINOIS.

BRAKE-BEAM.

958,060.  Specification of Letters Patent.  Patented May 17, 1910.

Application filed September 14, 1909. Serial No. 517,719.

*To all whom it may concern:*

Be it known that I, HENRY ZIEMSS, Jr., a citizen of the United States, residing at Chicago, in the county of Cook and State of Illinois, have invented certain new and useful Improvements in Brake-Beams, of which the following is a specification.

One object of my invention is to produce an improved brake beam of simple construction and in which the sleeve commonly used for mounting the brake head is dispensed with.

Another object is the provision of improved means for adjustably securing a brake head to a brake beam.

In the accompanying drawings, Figure 1 is an end view of a brake beam and brake head embodying the features of my invention. Fig. 2 is a fragmental vertical section through said parts. Fig. 3 is a fragmental sectional view taken in the plane of dotted line 3 3 of Fig. 1.

In the embodiment herein shown of my invention, the brake beam proper consists of a commercial steel shape such as an I-beam 1 cut to the proper length. One head or flange of the I-beam is bent for a suitable distance at each end of the beam to form a curved surface or seat 2. In this instance the seat 2 is convex and is curved on the arc of a circle.

The brake head 3 is recessed upon its rear side to form a concave surface 4 which is curved on the arc of a circle and conforms to the curvature of the seat 2. On the outer side of the brake head may be provided stop means, such as a flange 5 arranged to lie adjacent to the end of the brake beam. The brake head is adjustably secured upon the seat 2 by beams herein shown as comprising a suitable number of bolts 6, said bolts extending through an undercut groove or T-slot 7 formed in said brake head, and through suitable openings 8 in the seat 2. The heads of the bolts 6 lie within the undercut portion of the groove 7, nuts 9 being turned upon the outer ends of said bolts, whereby when the nuts are tightened up, the heads of the bolts will clamp the brake head securely to the seat 2. Suitable means, such as a nut lock 10, may be provided to prevent accidental rotation of the nuts 9. If desired, the under side of the head of each bolt 6 and the contacting portions of the walls of the groove 7 may be serrated or grooved, as indicated in Figs. 2 and 3.

In use, the brake head is adjusted upon the brake beam so as to properly present the brake shoe to the wheel, and is then secured in place by tightening up the bolts 6. It will be seen that the brake head may be rocked upon the brake beam to take any desired angular position with reference to the beam.

The construction hereinbefore outlined dispenses with the sleeve heretofore commonly used. The beam proper is strong and extremely simple in construction, and the brake-head-securing means is likewise of simple and durable construction.

I would have it understood that the invention is not limited to the details herein shown and described, for various modifications will occur to persons skilled in the art.

I claim as my invention:

1. The combination of a brake beam consisting of an I-beam having one head thereof bent to provide a curved seat; a brake head having a curved surface in direct contact with said seat; and means for securing said brake head to said seat.

2. The combination of a brake beam consisting of a commercial rolled beam having one head thereof bent to provide a convex seat, said seat being curved upon the arc of a circle; a brake head having a concave surface conforming to said seat; and means for adjustably securing said brake head to said seat.

3. The combination of a brake beam consisting of a commercial rolled beam having one head thereof bent to provide a curved seat; a brake head having a curved surface in direct contact with said seat, said brake head having a T-slot therein; and means extending through said slot and through said bent head adapted to clamp said brake head to said seat in adjusted position with reference to the beam.

4. A brake head having a curved rear side, a T-slot being formed in said rear side, said slot opening upon the rear side of the head.

5. A brake head having a recess in its rear side, which recess is curved upon the arc of a circle, a T-slot being formed in said brake head, which slot is curved upon the arc of a circle concentric with said recess.

6. A brake head having a recess in its rear side, said recess being curved upon the arc of a circle, said brake head having a T-slot formed therein, said slot being curved upon the arc of a circle concentric with said recesses, the ends of said slot extending to and opening upon the rear side of said brake head; and a stop portion upon said brake head at one side of said recess.

HENRY ZIEMSS, Jr.

Witnesses:
 ADAM WEDOW,
 CHAS. ZIEMSS.